United States Patent Office 3,466,582
Patented Sept. 9, 1969

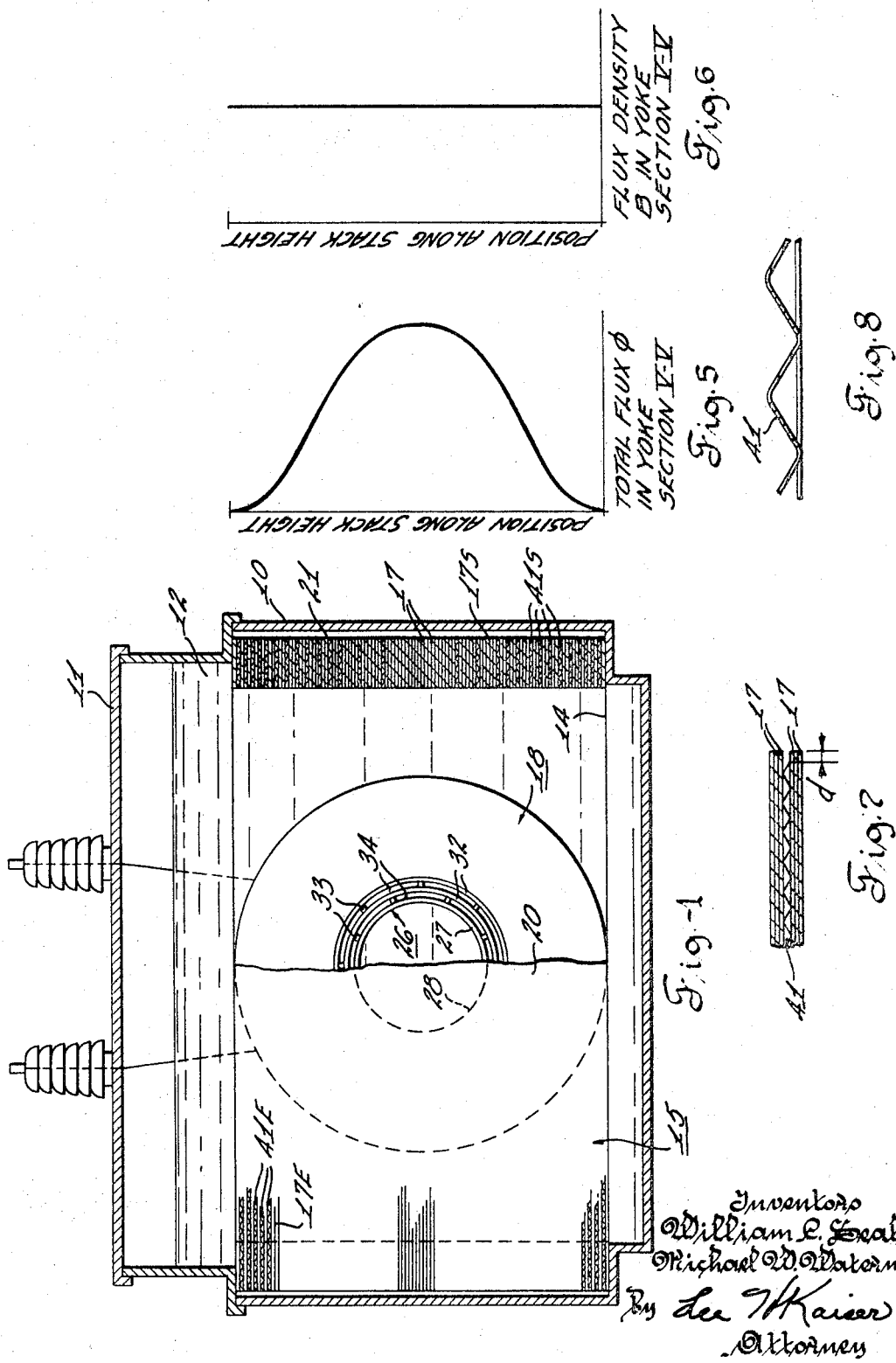

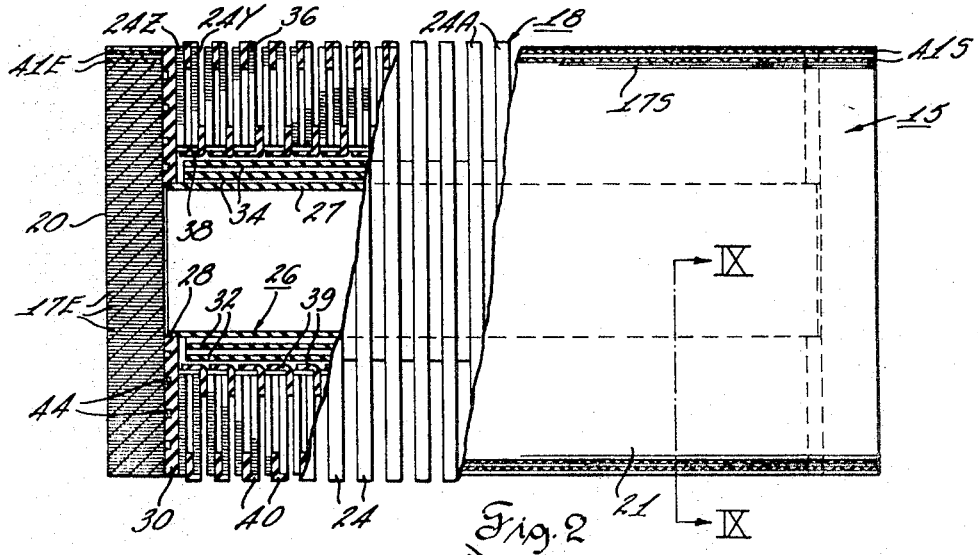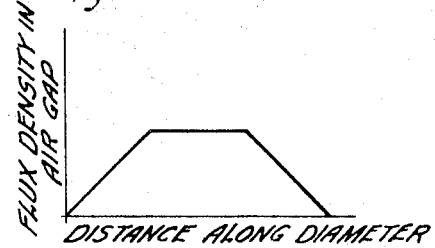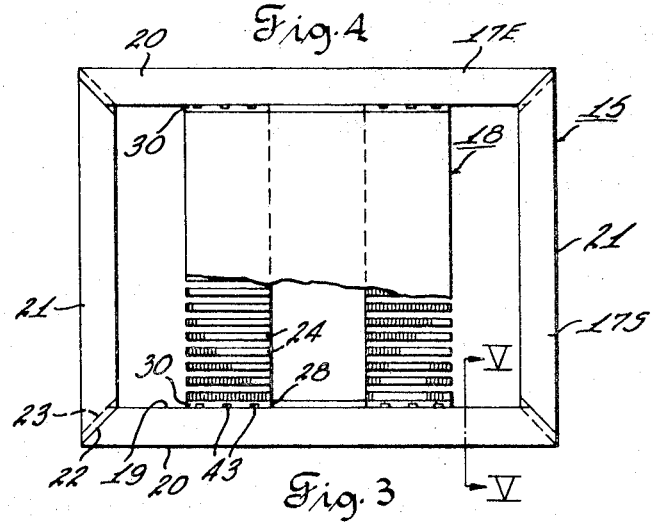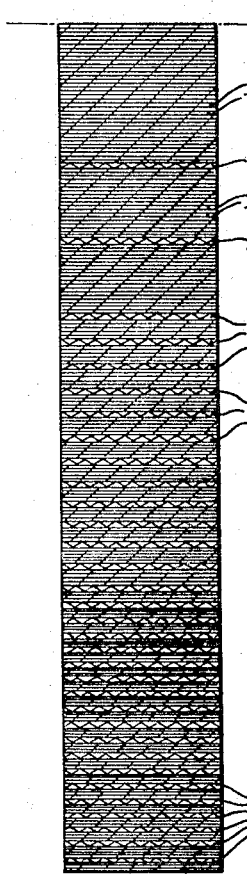

3,466,582
MAGNETIC YOKE FOR SHUNT REACTOR
William C. Sealey, Wauwatosa, and Michael W. Waterman, Milwaukee, Wis., assignors to Allis-Chalmers Manufacturing Company, Milwaukee, Wis.
Filed July 28, 1967, Ser. No. 656,807
Int. Cl. H01f 27/08
U.S. Cl. 336—60                    15 Claims

ABSTRACT OF THE DISCLOSURE

A magnetic yoke for a shunt reactor having a horizontal coil with nonmagnetic means extending axially thereof comprises a stack of magnetic steel laminations in planes parallel to the axis of the coil defining yoke end portions closely adjacent the ends of the coil and yoke side portions connecting the yoke end portions and forming a closed low reluctance path in surrounding relation to the coil. The total magnetic flux in the yoke is a maximum opposite the coil axis and diminishes toward the upper and lower edges of the stack. Horizontal layers of spacers having poor magnetic characteristics are provided in the portions of the yoke wherein the total flux is less than said maximum, and preferably the number of layers of spacers in each inch of stack height is a minimum opposite the coil axis and increases as a function of the total magnetic flux therein toward the upper and lower edges of the stack so that the magnetic flux density is approximately uniform in any cross section through the yoke. The spacers are preferably expanded metal and define cooling ducts between laminations to dissipate heat generated by losses therein.

---

This invention relates to stationary induction apparatus such as shunt reactors and in particular to magnetic yokes for shunt reactors.

Shunt reactors are used in high voltage, alternating current power distribution and transmission lines to compensate for line charging current and to allow the charge remaining on the line to bleed to ground when the line is opened. A shunt reactor is usually immersed in oil within a tank, and the reactor may be constructed without a ferromagnetic core so that it will have high magnetizing current. The magnetic flux near the axial ends of the shunt reactor coil deviates from the axial direction, and the radial component of the magnetic flux, or cross flux, results in high eddy current losses and reacts with the current in the conductor turns of the coil to produce high compressive forces and may set the structure into vibration of destructive magnitude. Cross flux and its disadvantages are substantially eliminated in the extra high voltage (EHV) shunt reactor disclosed in our copending application Ser. No. 553,8444 entitled Means for Increasing the Inductance of Shunt Reactors, filed May 31, 1966 and having the same assignee as the present invention, wherein a closed magnetic yoke having laminations in planes parallel to the axis of the shunt reactor coil surrounds the coil to reduce the reluctance of the magnetic circuit external to the coil and has portions closely adjacent to the axial ends of the coil to induce an axial direction of the flux within the coil.

The reactor coil comprises a plurality of axially aligned pancake coils constructed of rectangular conductor strip having a width in the axial direction considerably greater than its thickness in the radial direction which contributes materially to increase in the space factor and decrease in the length of the internal flux path so that the inductance of the reactor is substantially greater than that of an air core reactor of the same coil dimensions. The pancake windings are disposed in a stack and arranged in two similar coil groups of series-connected pancake winding connected in parallel and wound in opposite directions, and the high voltage lead is connected to pancake windings adjacent the center of the coil stack and the ground lead is connected to pancake windings at the axial ends of the stack so that the yoke-to-winding potential is a minimum at the axial ends of the stack and the yokes can be closely adjacent the coil so they have maximum effect in straightening the lines of magnetic flux within the reactor coil. The shunt reactor coil is short in the axial direction and preferably has a high ratio of coil radius to coil axial height, $R/b$, which further increases the inductance in comparison to prior art reactors. This structure substantially eliminates fringing flux in the radial direction and results in magnetic flux lines which are straight to such a marked degree that the wide conductor strip, which substantially improves space factor, can be used without excessive eddy current loss and without compressive forces on the conductor strip.

Shunt reactors are known which utilize magnetic yokes adjacent both axial ends of the reactor coil to straighten the lines of magnetic flux, but the two yokes in many of such reactors are subject to high attractive forces under operating conditions which tend to compress and crush the reactor coil in an axial direction, and insulating members of such material as porcelain having high compressive strength must be positioned within the axial opening in the reactor coil to prevent crushing of the coil. Other shunt reactors are known wherein closed laminated magnetic cores surround the reactor coil, but the magnetic cores are only utilized for shielding the steel walls of the reactor tank from excessive eddy current losses and must be spaced so far from the end pancake windings because of the high potential therebetween that they contribute only slightly to straightening the lines of magnetic flux within the reactor coil. The magnetic yoke of our aforementioned application Ser. No. 553,844 had the disadvantage that it is heavier than necessary and uses more iron than required to carry the magnetic flux in certain portions of the yoke.

It is an object of the invention to provide an improved closed magnetic yoke for a shunt reactor which contributes substantially toward straightening the lines of magnetic flux within the reactor coil and has the high mechanical strength of a beam loaded at both ends resisting attractive forces tending to crush the coil in an axial direction and is lighter in weight and less expensive than the magnetic yokes of prior art reactors and that of our aforementioned application. It is a further object of the invention to provide such an improved magnetic yoke which aids in cooling the reactor coil and in dissipating the heat generated by losses in the laminations of the yoke.

These and other objects and advantages of the invention will be more readily apparent from the following detailed description when considered in conjunction with the accompanying drawing wherein:

FIG. 1 is an end view of a shunt reactor embodying the invention with the tank end wall and a portion of the magnetic yoke broken away to show the coil construction;

FIG. 2 is a side view of the yoke and coil assembly of the shunt reactor of FIG. 1 with a portion of the magnetic yoke broken away and a portion of the reactor coil and the yoke shown in cross section;

FIG. 3 is a schematic plan view of the reactor of FIG. 1 with a portion of the reactor coil broken away;

FIG. 4 is a graph plotting magnetic flux densities in the air gap between coil and yoke as ordinates against distances along the horizontal coil diameter, projected from FIG. 3, as abscissae;

FIG. 5 is a graph plotting total magnetic flux in a cross section along line V—V of FIG. 3 as abscissae against distance along the height of the yoke, projected from FIG. 1, as ordinates;

FIG. 6 is a graph plotting the magnetic flux densities in the cross section along line V—V of FIG. 3 as abscissae against vertical distance along the yoke, projected from FIG. 1, as ordinates;

FIG. 7 is an enlarged cross sectional view through a portion of the magnetic yoke including one of the spacers;

FIG. 8 is a cross sectional view through one of the spacers; and

FIG. 9 is an enlarged partial cross sectional view through the magnetic yoke along line IX—IX of FIG. 2 showing the arrangement of the spacers in greater detail.

Referring to the drawing, a shunt reactor embodying the invention may be used in each phase of a multiphase extra high voltage (EHV) electrical power transmission system rated at 345 kilovolts or above and includes a metallic tank 10 having a cover 11 and containing a dielectric cooling and insulating fluid 12 such as oil. Tank 10 has a horizontal shelf 14 extending around its periphery adjacent the lower portion of the tank which supports a closed magnetic yoke 15 immersed in oil 12 within tank 10 and having magnetic steel laminations 17 disposed in horizontal planes and parallel to the axis of a reactor coil 18 immersed in the oil 12 and positioned within the window 19 of the closed yoke 15 so that the coil axis is horizontal. Yoke 15 has end portions 20 defined by end laminations 17E disposed closely adjacent the axial ends of coil 18 and side portions 21 defined by side laminations 17S extending parallel to the coil axis and abutting against the ends of the end laminations 17E and together therewith defining a closed magnetic path of low reluctance surrounding coil 18. The ends of laminations 17E and 17S may be mitered as shown in FIG. 3, and the miter joints 22 and 23 between laminations 17E and 17S may be offset in alternate lamination layers to provide an overlap joint arrangement which decreases the reluctance of the iron path and increases the mechanical strength of the yoke.

Reactor coil 18 is similar to that disclosed in our aforementioned application Ser. No. 553,844, now Patent No. 3,362,002, and the application of August F. Wishman and Harding B. Hansen, Ser. No. 568,586, now Patent No. 3,362,001, filed July 28, 1966 and having the same assignee as the subject invention and to which reference is mdae for details of construction. Reactor coil 18 has a nonmagnetic axially extending core includes a plurality spaced, coaxial pancake windings 24 which surround and are supported by tubular insulating coil support means 26 of high dielectric strength extending through the axial openings in the pancake windings 24. Coil support means 26 may include a tube 27 of homogeneous insulating material such as phenolic material having a dielectric constant of approximately four which is approximately equal to that of cellulosic insulating material impregnated with the insulating dielectric liquid 12 so that it does not disturb the electrostatic field. Tube 27 is of sufficient tensile strength to support the weight of the pancake windings 24 as a uniformly loaded beam when tube 27 is supported at its ends within the circular opening 28 in insulating support washers 30 abutting against the end portions 20 of yoke 15, and preferably tube 27 is of thin wall section so that it has less heat to dissipate while retaining a large cooling surface. Coil support means 26 may also include a plurality of concentric inside insulating cylinders 32 preferably of cellulosic material impregnated with dielectric liquid 12 surrounding support tube 27 and being disposed between support tube 27 and the pancake windings 24 and spaced apart by arcuately spaced, elongated insulating spacers 33 extending parallel to the axis of the coil 18 and providing cooling ducts 34 parallel to the axis of the coil 18 for circulation of the dielectric liquid 12.

The pancake windings 24 are preferably arranged in two parallel connected groups, or coil halves, each of which comprises the pancake windings 24 between one axial end and the center of the coil stack, and the pancake windings 24 in each group are connected in series and the two groups are connected in parallel and wound in opposite directions so that the direction of magnetic flux in all portions of coil 18 is the same. The high voltage lead (not shown) at the junction between the two parallel connected groups is connected to a pair of pancake windings 24A at the center of the coil stack, one of which is in each of the coil groups, and the ground lead at the junction between the two parallel connected groups is connected to the pancake windings 24Z at the axial ends of the stack so that the potential difference between the pancake windings 24Z at the ends of the coil stack and the magnetic yoke 15 is a minimum and the yoke end portions 20 may be closely adjacent the end pancake windings 24Z where they are most effective in straightening the lines of magnetic flux within coil 18. Preferably the axial spacing between the end pancake windings 24Z and the end yoke portions 20 is approximately equal to the winding-to-winding axial spacing and should not be greater than twice the winding-to-winding spacing, and such structure generates a magnetic field wherein the flux lines are straight to a marked degree and parallel to the axis of the coil 18.

The pancake windings 24 are preferably wound from continuous strip conductor 36 of rectangular cross section having a width in the axial direction substantially greater than its thickness in the radial direction. Copper strip 0.05 inch thick and 0.25 inch wide may be employed for conductor 36, and each turn of strip 36 is suitably insulated from the adjacent turn. A static plate (not shown) may be provided at the center of the coil stack between pancake windings 24A, and the pancake windings 24 of each coil half are preferably arranged in pairs of adjacent windings electrically connected together at their radially inner end. For example, the pancake windings 24Y and 24Z constitute a winding pair YZ and are electrically connected at their inner end by a conductor shown at 38. Adjacent winding pairs are electrically connected together at their radially outer end. Insulating washers (not shown) preferably of cellulosic material impregnated with dielectric liquid 12 are disposed between the pancake windings 24 of each pair and also between adjacent pairs of pancake windings, and radially extending insulating spacer sticks (not shown) are affixed to the insulating washers and define cooling ducts for circulation of the dielectric liquid 12 in a vertical direction between adjacent winding pairs and between the pancake windings 24 of each winding pair.

The voltage gradient is highest adjacent the edges of the radially inner and radially outer conductor turns of the pancake windings 24, and inner annular insulating collars 39 of L-shaped cross section and preferably of cellulosic material impregnated with dielectric liquid 12 may be disposed over the edges of the radially inner conductor turns of the pancake windings between adjacent winding pairs and overlap the insulating washers and similar outer insulating collars 40 of L-shape cross section may be disposed over the edges of the radially outer conductor turns of the pancake windings where the voltage gradient is the highest and may have radially extending portions disposed between the pancake windings 24 of each winding pair and overlapping the insulating washers.

Elongated flat fillers, or spacers 41, are provided in horizontal layers between the laminations 17 of yoke 15, and the number of layers of spacers 41 is varied along the height of the yoke 15 so that the magnetic flux density in the iron path external to coil 18 is approximately uniform along any vertical cross section through the yoke 15. End spacers 41E are positioned between the end laminations 17E in the yoke end portions 20 and side spacers 41S are positioned between the side laminations 17S in the yoke end portions 21, and it will be appreciated that two end spacers 41E and two side spacers 41S comprise a horizontal spacer layer. The spacers 41 may be of insulating material such as fiberboard, but in the preferred embodiment the spacers 41 are of expanded metal construction, wherein the metallic sheet is cut and stretched into a lattice, and may be of low carbon steel material having poor magnetic characteristics in comparison to the magnetic steel laminations 17 so that the spacers electrically connect the magnetic steel laminations 17 between which they are disposed. As described hereinafter the edges of the papers 41 facing the coil in at least the yoke end portions 20 are recessed inwardly from the edges of the abutting laminations so that the spacers 41 do not disturb the magnetic filed to an appreciable degree.

FIG. 4 is a graph of the magnetic flux densities in the air gap between coil 18 and yoke 15 plotted as ordinates against distances along the coil diameter, projected from FIG. 3, as abscissae and shows that the flux density is a maximum and substantially uniform across the axial opening in the coil and decreases in a straight line from a maximum at the radially inner edge of the pancake windings 24 to zero adjacent the radially outer edge of the pancake windings 24. The yoke 15 is of approximately the same height as coil 18, and it will be appreciated that if the yoke comprised only laminations 17 and if all laminations were of the same width, the flux density would be higher in the laminations 17E opposite the axial opening in coil 18 than in the laminations 17E adjacent the upper and lower edges of the yoke and that a greater amount of steel would be present in the laminations adjacent the upper and lower yoke edges than necessary to operate all portions of the magnetic steel near maximum flux density. In certain embodiments of the invention, yoke 15 is of semicruciform cross section (not shown) with the widest laminations opposite the axial opening in the coil 18 and the laminations decreasing in width approximately along the curve of FIG. 4 so that the narrowest laminations would be adjacent the upper and lower edges of the yoke and the magnetic flux density was approximately uniform in any vertical cross section through the yoke. However, the smallest width laminations adjacent the upper and lower yoke edges in such embodiment are mechanically weak relative to the wider laminations and are deflected to a greater extent than the wider laminations with the result that the noise generated by the yoke is increased and the insulation adjacent such narrower and weaker laminations may be damaged.

In the preferred embodiment of the invention, the cross sectional area of iron per unit dimension of yoke height, e.g., per inch, is a maximum near the center of the yoke opposite the axial opening in the coil 18 where the flux density is a maximum and decreases progressively from the center toward the upper and lower edges of the yoke 15 so that the flux density in any vertical cross section through the yoke is approximately uniform along the entire height of the yoke as shown in FIG. 6, and this is accomplished using laminations 17E and 17S all of which are of the same width by varying the number of layers of spacers 41 per inch along the height of yoke 15. Such uniform width avoids mechanically weak laminations with resulting generation of excessive noise and damage to insulation that sometimes occurred in embodiments having yokes of semicruciform cross section with the widest laminations at the center of the yoke and the narrowest laminations adjacent the upper and lower yokes of the yoke.

As best known in FIG. 9, layers of fillers 41 may be omitted in the portions of the yoke 15 along the axis of the coil 18 for five inches above and below the coil axis in a reactor having a stack height of approximately sixty inches; the next five inches of yoke height may include two layers of vertically spaced fillers 41S1 each having a thickness of approximately 1/8 inch; the next five inches of yoke height may have six vertically spaced layers of fillers 41S2 each of which is 1/4 inch thick; and the number of layers of spacers and their thickness may progressively increase in each five inches of stack height to a maximum of eleven layers of fillers 41S3 of approximately 3/8 inch thickness each in the five inches of yoke height at the top and bottom of the yoke.

FIG. 5 illustrates the values of total flux in a vertical cross section through yoke 15 taken along line V—V of FIG. 3 and plotting total flux as abscissae against distances along the height of the yoke, projected from FIG. 1, as ordinates, and it will be appreciated that the total magnetic flux is greatest at the center of the yoke where a minimum number of layers of fillers 41 is utilized and decreases toward the upper and lower edges of the yoke. The number of layers of fillers 41 per unit dimension of yoke height is varied so that the flux density, i.e., total flux divided by cross sectional area of iron, along any vertical cross section through the yoke is approximately uniform as shown in FIG. 6 which is a graph plotting the flux densities in the cross section along line V—V of FIG. 3 as abscissae against vertical positions along the yoke height, projected from FIG. 1, as ordinates.

As shown in FIG. 7, the edge of the layers of fillers 41 facing the coil is stepped back a distance $d$ of from 1/4 to 1/2 inch from the inner edges of the laminations 17S and 17E to increase the reluctance of the flux path into the fillers 41. Further a plurality of vertically spaced, relatively thin layers of spacers 41 preferably less than 1/2 inch thick are utilized rather than a single thicker spacer layer, or a plurality of abutting thin layers, to prevent the spacers 41 from disturbing the magnetic field. For example, if a three inch thick layer of spacers 41 is utilized, some of the magnetic flux would flow into the carbon steel spacers 41 and the magnetic field would be disturbed.

The lattice construction of the expanded metal spacers 41 defines cooling ducts for the flow of the dielectric liquid 12 between the laminations 17 to cool the laminations and dissipate the heat generated by core loss in the laminations. Vertical grooves 43 (see FIG. 3) and horizontal grooves 44 (see FIG. 2) in the surface of the support washers 30 disposed against the yoke end portions 20 communicate with the cooling ducts defined by the expanded metal spacers 41, and the cooling ducts for circulation of liquid dielectric 12 defined by spacers 41 disposed near the center of the yoke communicate with the cooling ducts 34 extending parallel to the axis of the coil between the inside insulating cylinders 32 and aid in dissipating heat generated by dielectric losses in the insulation.

The disclosed yoke construction has the high mechanical strength of a beam supported at both ends so that substantially no deflection of the yoke end sections 20 occurs due to attractive forces therebetween and no forces are exerted on coil 18 tending to crush it in an axial direction as occurred with prior art shunt reactor yoke structures. Further, the amount of steel, and thus the weight and cost of the yoke, is substantially reduced in comparison to the yoke construction disclosed in our aforementioned application Ser. No. 553,844.

Although the preferred embodiment of the invention has been disclosed with a reactor coil constructed of annular pancake windings, it will be appreciated that the disclosed yoke construction is equally applicable to a reactor coil constructed of rectangular pancake windings and to a helical reactor coil, sometimes called a cylindrical coil. Further, although the preferred embodiment has been described with the coil axis horizontal and the yoke laminations in horizontal planes, the invention is not so limited and also comprises reactors having coils with a vertical axis and yoke laminations in vertical planes.

While only a single embodiment of the invention has been illustrated and described, many modifications and variations thereof will be readily apparent to those skilled in the art, and consequently it is intended in the appended claims to cover all such modifications and variations which are within the true spirit and scope of the invention.

The embodiments of the invention in which an exclusive property or privilege is claimed are defined as follows:

1. In combination with a shunt reactor coil having non-magnetic means extending axially thereof, a closed magnetic yoke comprising a plurality of layers of magnetic steel laminations in planes parallel to the axis of said coil arranged in a stack extending approximately equal distances on both sides of the axis of said coil and forming yoke end portions closely adjacent the axial ends of said coil and yoke side portions connecting said end portions and together therewith defining a low reluctance iron return path for the magnetic flux in surrounding relation to said coil, the total magnetic flux per inch of stack height in said iron return path being a maximum midway of the height of said coil and decreasing toward the extremities of said stack the cross sectional area of said magnetic steel laminations per inch of stack height being a maximum midway of the height of said stack in the plane of said coil axis and decreasing toward the extremities thereof, the laminations of said yoke end portions being of uniform width, and spacers disposed between said magnetic steel laminations in the portions of said stack where the total flux per inch of stack height is less than said maximum, said spacers being disposed in at least several of said layers between each said extremity of said stack and said plane midway of the height of said stack.

2. In the combination defined by claim 1 wherein said spacers are arranged in layers disposed between said lamination layers and each of which comprises spacers in said yoke end portions and spacers in said yoke side portions.

3. In the combination defined by claim 2 wherein said spacers are of a material having poor magnetic characteristics in comparison to magnetic steel and the number of said layers of spacers per unit dimension of stack height increases progressively from midway of the height of said stack toward the extremities thereof.

4. In the combination defined by claim 3 wherein the number of said layers of spacers in each inch of stack height is a function of the magnitude of total magnetic flux therein and the magnetic flux density is approximately uniform along the height of said stack.

5. In the combination defined by claim 1 wherein said spacers are of expanded metal having poor magnetic characteristics in comparison to magnetic steel which electrically connect the abutting laminations and define cooling ducts for the circulation of a dielectric liquid between said lamination layers.

6. In the combination defined by claim 4 wherein said spacers are of thin material less than one-half inch thick and each spacer abuts magnetic steel laminations in adjoining layers of said yoke.

7. In the combination defined by claim 5 wherein said spacers are less than one-half inch thick and each spacer abuts against magnetic steel lamination in adjacent layers and the edge of each said spacer which faces said coil in at least said yoke end portions is recessed inwardly from the edges of said laminations in said adjacent layers.

8. In the combination defined by claim 4 wherein said coil comprises a plurality of coaxial, axially spaced pancake windings uniformly spaced from each other and the spacing between said yoke end portions and the end pancake windings in said coil is no greater than twice the axial spacing between adjacent pancake windings and wherein the height of said stack of laminations in said yoke is approximately equal to the outside diameter of said pancake windings.

9. In combination with a shunt reactor coil having non-magnetic means extending axially thereof, a closed magnetic yoke comprising a plurality of layers of magnetic steel laminations in planes parallel to the axis of said coil arranged in a stack extending approximately equal distances on both sides of the axis of said coil and forming yoke end portions closely adjacent the axial ends of said coil and yoke side portions connecting said end portions and together therewith definng a low reluctance iron return path for the magnetic flux in surrounding relation to said coil, the total magnetic flux per inch of stack height in said iron return path being a maximum midway of the height of said stack in the plane of said coil axis and decreasing toward the extremities thereof, the cross sectional area of said magnetic steel laminations per inch of stack height being a maximum midway of the height of said stack in the plane of said coil axis and decreasing toward the extremities thereof, certain of said laminations being separated in the portions of said yoke wherein said cross sectional area of said laminations per inch of stack height is less than said maximum, at least several of said separations between said certain laminations occurring between each said extremity of said stack and said plane midway of the height of said stack.

10. In the combination defined by claim 9 wherein said cross sectional area of said magnetic steel laminations per inch of stack height decreases progressively and the number of said separations between laminations per inch of stack height increases progressively from said plane midway of the height of said stack as a function of the magnitude of the total magnetic flux therein toward the extremities of said stack and the magnetic flux density in said yoke is approximately uniform along the height of said stack.

11. In the combination defined by claim 10 wherein the laminations in said yoke end portions are of uniform width and including elongated flat spacers of a material having poor magnetic characteristics in comparison to said magnetic steel laminations disposed in said separations between said certain laminations in the portions of said yoke where the magnetic flux per inch of stack height is less than said maximum value midway of the height of said stack.

12. In the combination defined by claim 11 wherein said spacers are arranged in layers disposed between said lamination layers and each of which comprises spacers in said yoke end portions and spacers in said yoke side portions.

13. In the combination defined by claim 12 wherein the height of said stack of laminations is approximately equal to the outside diameter of said coil.

14. In the combination defined by claim 13 wherein said layers of spacer material are of expanded metal and define cooling ducts for circulation of a dielectric liquid between said lamination layers.

15. In the combination defined by claim 14 wherein said spacers are less than one-half inch thick and both flat surfaces of each spacer abut against magnetic steel laminations in adjacent layers and the edge of each spacer which faces said coil in said yoke end portions is recessed inwardly from the edges of said laminations in said adjacent layers.

References Cited
UNITED STATES PATENTS

| | | | |
|---|---|---|---|
| 420,396 | 1/1890 | Thomson | 336—219 |
| 834,160 | 10/1906 | Nichols | 336—185 XR |
| 2,710,947 | 6/1955 | Gaston | 336—60 |
| 2,725,502 | 11/1955 | Chiles et al. | 336—219 XR |
| 2,892,169 | 6/1959 | Teague et al. | 336—219 XR |
| 3,132,318 | 5/1964 | Kiltie | 336—219 XR |
| 3,195,087 | 7/1965 | Welch | 336—210 XR |
| 3,341,793 | 9/1967 | Wale et al. | 336—219 XR |
| 3,362,001 | 1/1968 | Wishman et al. | 336—185 XR |

LEWIS H. MYERS, Primary Examiner

T. J. KOZMA, Assistant Examiner

U.S. Cl. X.R.

336—219